(12) United States Patent
Phillips

(10) Patent No.: US 8,056,970 B1
(45) Date of Patent: Nov. 15, 2011

(54) ITEM CATCHER FOR AN AUTOMOBILE CONSOLE GAP

(76) Inventor: Jennie L. Phillips, Asheville, NC (US)

(*) Notice: Subject to any disclaimer, the term of this patent is extended or adjusted under 35 U.S.C. 154(b) by 251 days.

(21) Appl. No.: 12/506,928

(22) Filed: Jul. 21, 2009

(51) Int. Cl.
*A47D 15/00* (2006.01)

(52) U.S. Cl. .................. 297/182; 297/188.06; 296/37.8; 296/1.07

(58) Field of Classification Search ............... 297/181, 297/182; 296/24.34, 1.07, 37.8; 224/544, 224/543, 539, 542, 275
See application file for complete search history.

(56) References Cited

U.S. PATENT DOCUMENTS

| | | | |
|---|---|---|---|
| 2,571,574 A | 10/1951 | Hicks | |
| 2,836,229 A * | 5/1958 | Spetner | 297/182 |
| 5,085,481 A * | 2/1992 | Fluharty et al. | 296/37.8 |
| 7,452,032 B1 * | 11/2008 | Roeder et al. | 297/330 |
| 7,527,314 B2 * | 5/2009 | Dohan | 296/37.8 |
| 7,758,090 B2 * | 7/2010 | Gregory | 296/1.07 |
| 2008/0283565 A1 * | 11/2008 | Simon et al. | 224/542 |

* cited by examiner

*Primary Examiner* — David Dunn
*Assistant Examiner* — Erika Garrett
(74) *Attorney, Agent, or Firm* — Crossley Patent Law; Mark A. Crossley

(57) ABSTRACT

An item catcher for an automobile console gap, which is utilized to removably cover a gap between an inside surface of a vehicle seat and a vehicle console adjacent to the vehicle seat and collect small items which may otherwise fall into the gap. The item catcher includes an elongated, flexible, thin parallelepiped body which has an obround aperture centered near one end of the body to accommodate passage of a seat belt therethrough. The body folds along a central longitudinal axis from a flat first position into a folded second position in which the body is maintained while pressing the to body downwardly between the inside surface and the console and then is released into it a third position in which a body first side is pressed against the inside surface and a body second side is pressed against the console.

2 Claims, 3 Drawing Sheets

ITEM CATCHER FOR AN AUTOMOBILE CONSOLE GAP

BACKGROUND OF THE INVENTION

Various types of debris catching devices are known in the prior art. However, what is needed is an item catcher for an automobile console gap which removably covers a gap between a vehicle seat inside surface and a vehicle console and that includes an elongated, flexible body having an aperture for receiving a seat belt buckle therethrough.

FIELD OF THE INVENTION

The present invention relates to debris catching devices, and more particularly, to an item catcher for an automobile console gap which removably cover a gap between a vehicle seat inside surface and a vehicle console and that includes an elongated, flexible body having an aperture for receiving a seat belt buckle therethrough.

SUMMARY OF THE INVENTION

The general purpose of the present item catcher for an automobile, described subsequently in greater detail, is to provide an item catcher for an automobile console gap which has many novel features that result in an item catcher which is not anticipated, rendered obvious, suggested, or even implied by prior art, either alone or in combination thereof.

To accomplish this, the present item catcher is utilized to removably cover a gap between an inside surface of a vehicle seat and a vehicle console adjacent to the vehicle seat and collect debris which may otherwise fall into the gap. The item catcher includes an elongated, flexible, thin parallelepiped body which has an obround aperture centered near one end of the body to accommodate passage of a seat belt therethrough. The body folds along a central longitudinal axis from a flat first position into a folded second position in which the body is maintained while pressing the body downwardly between the inside surface and the console and then is released into a third position in which a body first side is pressed against the inside surface and a body second side is pressed against the console. In the third position, the body snuggly fills the gap between the vehicle seat inside surface and the vehicle console.

The instant item catcher may be utilized an unlimited number of times. By filling the gap between the vehicle seat inside surface and the vehicle console, the item catcher prevents small items, such as a cell phone, a credit card, a tube of lipstick, wallet, or cigarette lighter, debris, or even a cigarette, from falling into the gap. In turn, the situation in which a driver must reach for and grope for such debris and small items which haven fallen into the gap is reduced. By reducing the frequency in which a driver is distracted and increasing driver focus on the activity of driving, the present item catcher also increases traffic safety. The present device also helps to maintain passenger compartment cleanliness and reduces the potential for injury, such as a pinched or cut finger, which might otherwise occur while groping for debris or small items which have fallen into the gap. The present item catcher may be used to cover the gap between a driver's seat and the console or to cover the gap between a passenger's seat and the console.

Thus has been broadly outlined the more important features of the present item catcher for an automobile so that the detailed description thereof that follows may be better understood and in order that the present contribution to the art may be better appreciated.

Numerous objects, features and advantages of the present item catcher for an automobile will be readily apparent to those of ordinary skill in the art upon reading the following detailed description of presently preferred, but nonetheless illustrative, examples of the present item catcher when taken in conjunction with the accompanying drawings. In this respect, before explaining the current examples of the present item catcher in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the present item catcher. It is therefore important that the claims be regarded as including such equivalent constructions insofar as they do not depart from the spirit and scope of the present invention.

Objects of the present item catcher, along with various novel features that characterize the invention are particularly pointed out in the claims forming a part of this disclosure. For better understanding of the item catcher, its operating advantages and specific objects attained by its uses, refer to the accompanying drawings and description.

BRIEF DESCRIPTION OF THE DRAWINGS FIGURES

DETAILED DESCRIPTION OF THE DRAWINGS

Figure 1:
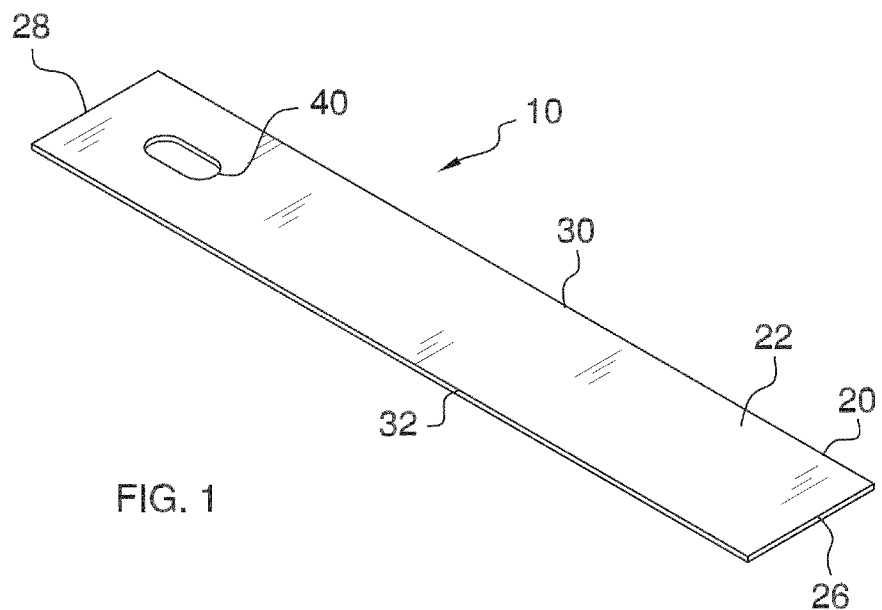
FIG. 1 is a top isometric view, the opposite side being a mirror image of the shown.
Figure 2:
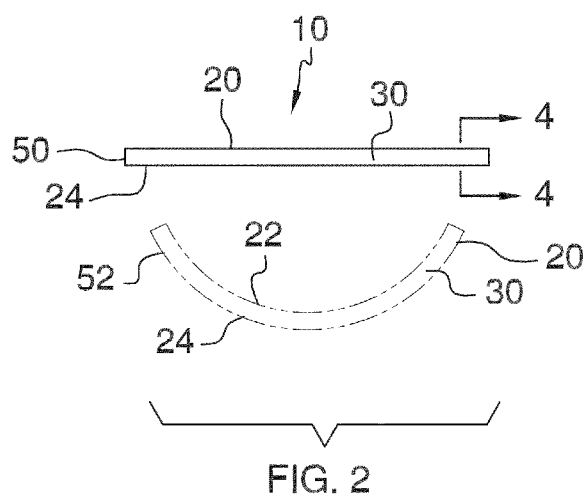
FIG. 2 is a right side elevation view shown in a flat, initial first position and in a bended, in-use second position, the opposite side being a mirror image of the shown.
Figure 3:
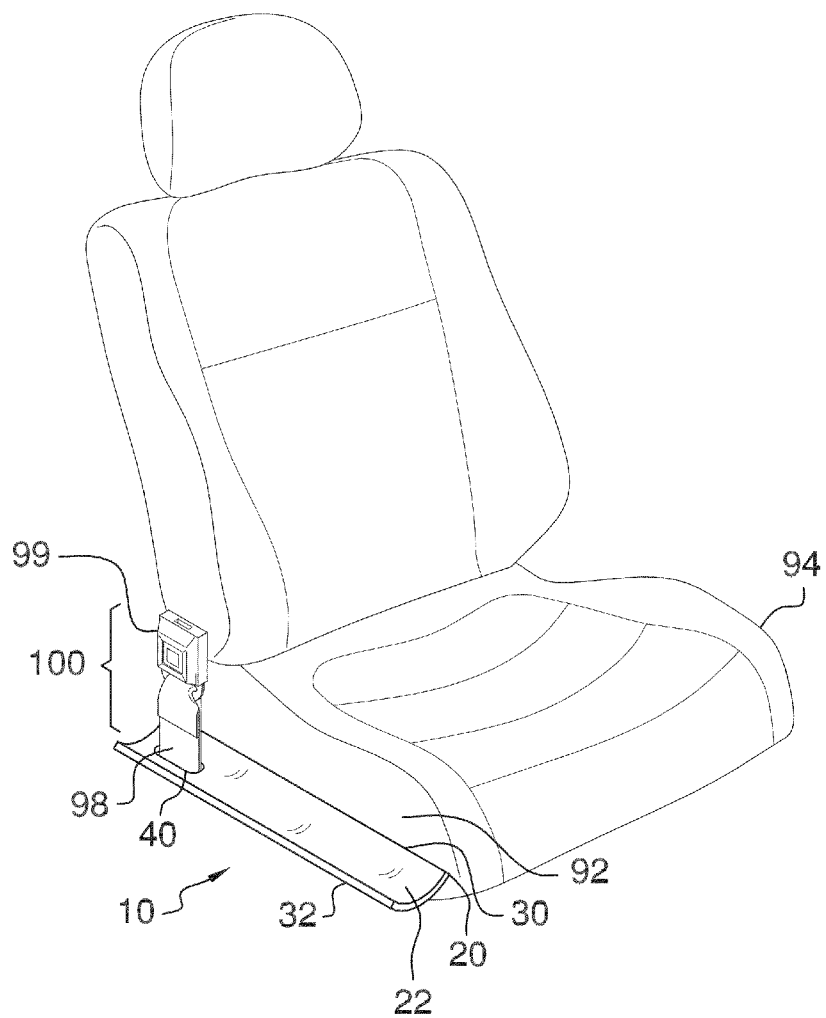
FIG. 3 is an in-use top isometric view illustrated installed adjacent to a vehicle seat.
Figure 4:
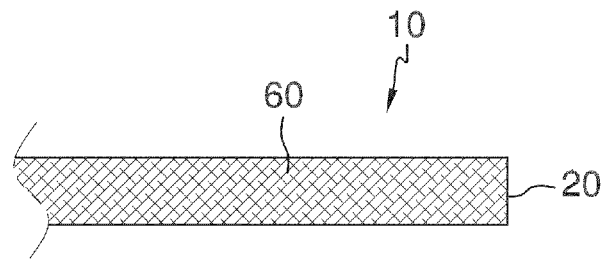
FIG. 4 is a cross-section view taken along line 4-4 of FIG. 2.
Figure 5:
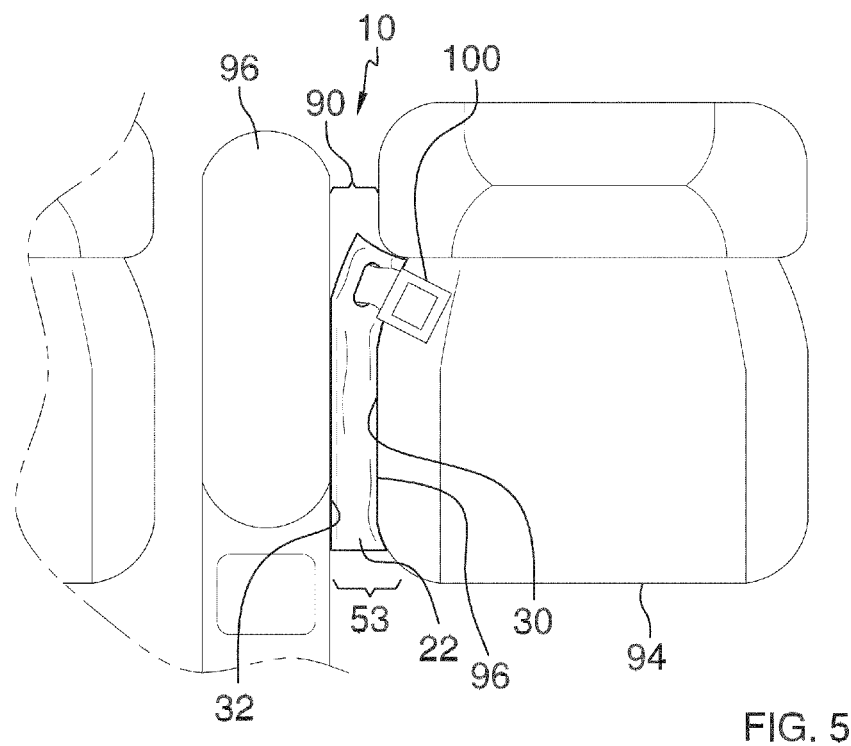
FIG. 5 is an in-use top plan view illustrated installed between a vehicle seat and a console.

With reference now to the drawings, and in particular FIGS. 1 through 5 thereof, example of the instant item catcher for an automobile console gap employing the principles and concepts of the present item catcher and generally designated by the reference number 10 will be described.

The present item catcher 10 is utilized to removably cover a gap 90 between an inside surface 92 of a vehicle seat 94 and a vehicle console 96 adjacent to the vehicle seat 94. The item catcher 10 includes an elongated, flexible, thin parallelepiped body 20. The body 20 has a top side 22, a bottom side 24, a first end 26, a second end 28 it opposite the body first end 26, a first side 30, and a second side 32 opposite the body first side 30.

An obround aperture 40 runs from the top side 22 through the bottom side 24 of the body 20. The aperture 40 is disposed near the body 20 first end 26 and is centered between the body 20 first side 30 and the body second side 32. The aperture 40 has a width in a range of about 46 mm to 76 mm and a diameter in a range of about 31.75 mm to about 44.45 mm. The width and diameter dimensions are important to accommodate passage of varying widths of seat belts 98 and the corresponding seat belt buckle 98 diameter through the aperture 40.

The body 20 folds along a central longitudinal axis from a flat first position 50 into a folded second position 52. The item catcher 10 collects debris that would otherwise fall into the gap 90 between the vehicle seat 94 inside surface 92 and the vehicle console 96. The aperture 40 removably receives a buckle portion 100 of the seat belt 98 therethrough.

The body 20 has a length in a range of about 15 inches to about 19 inches and a width in a range of about 2½ inches to about 5 inches. The length range of the body 20 is important to align with the inside surface 92 of the vehicle seat 94 without being too short, and thus not adequately collecting debris spilled between the vehicle seat 94 and the console 96 and without being too long, and thus sticking out beyond the vehicle seat 94 inside surface 92. The width range of the body is important to accommodate varying distances between a vehicle seat 94 inside surface 92 and a vehicle console 96. The flexible body 20 may be formed from a flexible material 60 such as nylon material or leather.

Use:

Use of the present item catcher 10 is initiated by placing the body 20 first side 30 adjacent to the vehicle seat 94 inside surface 92 and the body 20 top side 22 facing upwardly, then sliding the buckle portion 100 of the seat belt 98 through the aperture 40. This is followed by folding the body 20 along the central longitudinal axis from the flat first position 50 into a folded second position 52. While maintaining the body 20 in the second position 52, a user continues installation of the item catcher 10 by pressing the body 20 downwardly. Then, the installation is completed by releasing the body 20 from the second position 52 and placing the body 20 into a third position 53 wherein the first side 30 of the body 20 presses against the vehicle seat 94 inside surface 92 and the second side presses against the vehicle console 96, whereby the gap 90 between the vehicle seat 94 inside surface 92 and the vehicle console 96 is covered, thus permitting the item catcher 10 to collect an amount of debris which may otherwise fall into the gap 90.

Removing the item catcher 10 from its location between the vehicle seat 94 inside surface 92 and the vehicle console 96 begins by removing the body 20 from the third position 53 between the vehicle seat 94 inside surface 92 and the vehicle console 96. This is done by slidingly releasing the buckle portion 100 of the seat belt 98 from the aperture 40, folding the body 20 along the central longitudinal axis into the second position 52, and lifting the body 20 upwardly. Upon removing the item catcher 10, the user maintains the item catcher in a second position 52 while emptying an amount of debris collected on the top side 22 of the body 20. Then, the item catcher 10 may be returned to the flat first position 50.

With respect to the above description then, it is to be realized that the optimum dimensional relationships for the parts of the present item catcher to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for utilizing an item catcher for covering a gap between an inside surface of a vehicle seat and a vehicle console adjacent to the vehicle seat, wherein the method comprises:

utilizing an item catcher comprising:
an elongated, flexible, thin parallelepiped body having a length in a range of about 15 inches to about 19 inches and a width in a range of about 2½ inches to about 5 inches, the body comprising:
a top side;
a bottom side;
a first end; and
a second end;
an obround aperture having a width in a range of 46 mm to 76 mm and a diameter in a range of about 31.75 mm to about 44.45 mm, the aperture running from the top side through the bottom side of the body, the aperture disposed near the body first end and is centered between the body first side and the body second side;
wherein the body folds along a central longitudinal axis from a flat first position into a folded second position;
wherein the body removably covers a gap between an inside surface of a vehicle seat and a vehicle console;
wherein the aperture removably receives a buckle portion of a vehicle seat belt therethrough;
placing the body first side adjacent to the vehicle seat inside surface;
placing the body top side facing upwardly;
sliding the buckle portion through the aperture;
folding the body along the central longitudinal axis from the flat first position into a folded second position;
maintaining the body in the second position and pressing the body downwardly;
releasing the body from the second position and placing the body into a third position wherein the first side presses against the vehicle seat inside surface and the second side presses against the vehicle console wherein the gap between the vehicle seat inside surface and the vehicle console is covered.

2. The method of claim 1 further comprising:
removing the body from the third position between the vehicle seat inside surface and the vehicle console by slidingly releasing the buckle portion from the aperture, folding the body along the central longitudinal axis into the second position, and lifting the body upwardly; and
maintaining the body in the second position and emptying an amount of debris collected on the top side of the body; and
returning the body to the first position.

* * * * *